United States Patent Office 2,891,198
Patented June 16, 1959

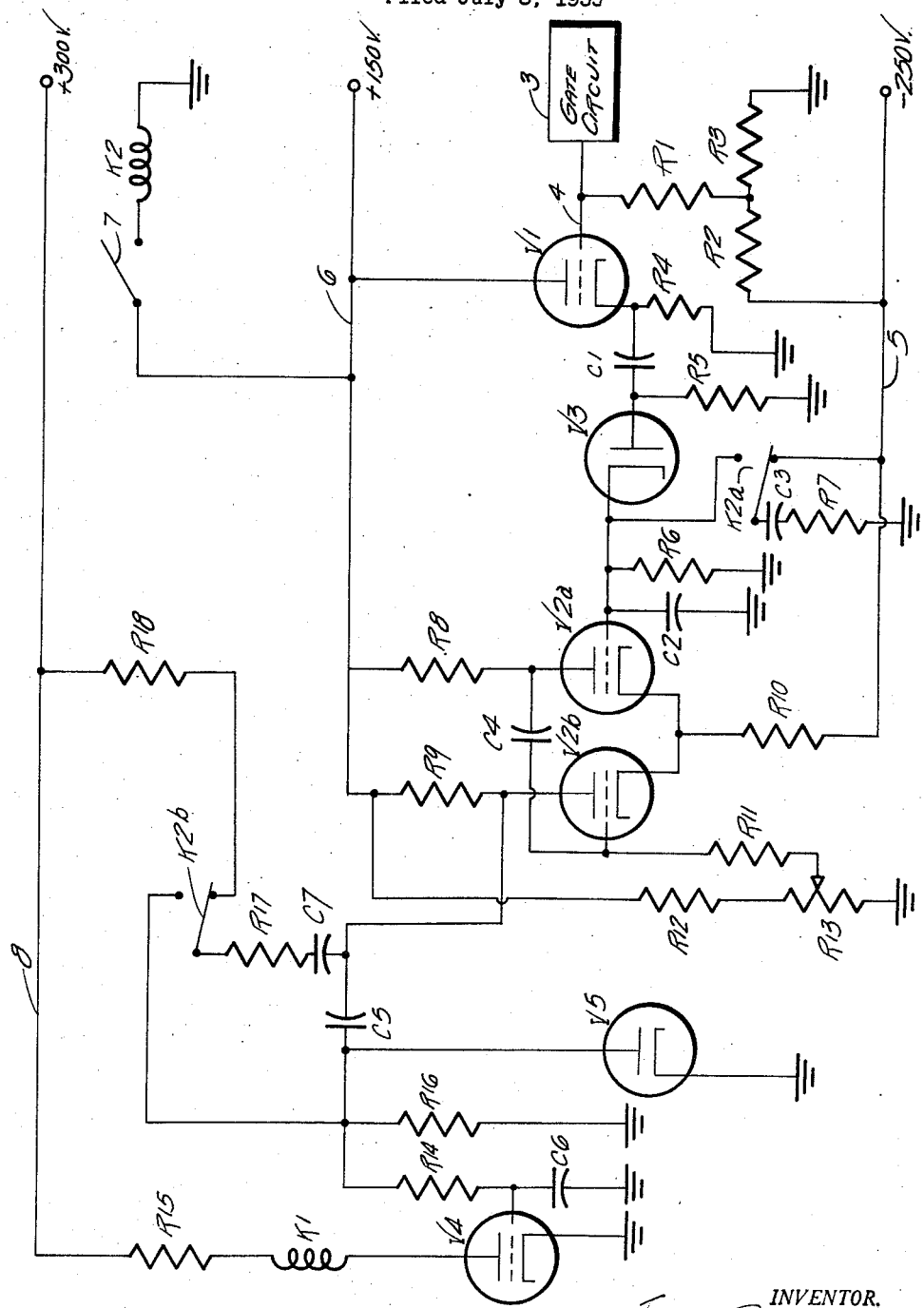

2,891,198

SELECTIVE SIGNAL ALARM CIRCUIT

Joseph P. Gleason, Encino, Calif., assignor, by mesne assignments, to the United States of America as represented by the Secretary of the Navy Application July 8, 1955, Serial No. 520,940

2 Claims. (Cl. 317—142)

The present invention relates to novel and improved apparatus for a radio echo detection system and more particularly to a novel and improved selective signal alarm circuit for a radar system which is relatively simple in construction and yet entirely reliable and dependable in operation.

In the various types of radio echo or radar apparatus with which the subject matter of the present invention is generally associated, it is ordinarily necessary and desirable to include a search circuit which continues to operate so long as no video echo pulse or the like is received at a time when the conventional coincidence tube gate circuits or the like of the apparatus is conditioned to become energized. When, however, substantial coincidence of the video echo pulse with energization of the gate circuit occurs, it is then generally necessary for the so-called alarm circuit of the apparatus to become actuated and to automatically terminate the searching operation of the system and begin to follow or track the target from which the video echo signal has been radiated. Although various types of so-called radar alarm circuits of this kind have been devised and used heretofore, considerable difficulty has been experienced in the past in obtaining results therefrom which satisfy in a practical and effective way requirements of the system which will be described more fully hereinafter.

It is a principal object of the present invention to provide a novel and improved selective signal alarm circuit for a radio echo or radar system.

It is a further object of the present invention to provide a novel and improved selective signal alarm circuit for a radar receiver which circuit is energized only after detection by the receiver of a predetermined number of video target pulses within a predetermined interval.

It is a further object of the present invention to provide a novel and improved selective signal alarm circuit for a radar receiver which circuit includes a unique target memory circuit.

Other objects and many of the attendant advantages of this invention will be readily appreciated as the same becomes better understood by reference to the following detailed description when considered in connection with the accompanying drawing wherein:

The single figure of the drawing is a circuit diagram of a preferred embodiment of the present invention.

In general the improved alarm circuit of the present invention includes a multivibrator circuit which controls energization of the search and track circuits of the radar receiver, and means responsive to the detection by the receiver of a predetermined number of video echo pulses within a predetermined interval for controlling energization of the multivibrator circuit. It has been found that such an alarm circuit provides improved automatic control of the energizing circuits for the searching and tracking apparatus of the radar system.

A preferred embodiment of the present invention is illustrated in the single figure of the drawing. As shown therein, the various video target echo pulses as well as the other occasional relatively high amplitude noise and non-synchronous jamming signals are delivered in the form of positive surges from the conventional gating circuit or the like 3 of the radar apparatus by way of conductor 4 to the control grid of the cathode follower V–1. The cathode follower is normally biased to cut-off by means of the connection of its control grid through resistor R–1 to the resistor divider circuit which extends between the negative 250 volt supply line 5 and ground and which includes resistors R–2 and R–3. The plate circuit of cathode follower V–1 extends from the positive 150 volt supply line 6 through the tube and resistor R–4 to ground.

The output circuit of cathode follower V–1 is coupled to the control grid of triode V–2a through the series connected diode V–3 and condenser C–1. The junction of diode V–3 and condenser C–1 is coupled to ground through resistor R–5. The junction of the diode V–3 and condenser C–1 is coupled to ground through resistor R–5. The junction of the diode V–3 and the control grid of V–2a is also coupled to ground through condenser C–2 and through resistor R–6.

Relay K–2 and manual switch 7 are preferably series connected between the positive 150 volt line 6 and ground as is shown. The armature K–2a of relay K–2 is coupled to ground through the series connected condenser C–3 and resistor R–7. One selective contact of the armature K–2a is connected to the junction of the diode V–3 and the control grid of triode V–2a. The other contact of armature K–2a is connected to the negative 250 volt supply line 5.

The plate circuits for the triodes V–2a and V–2b extend from the positive 150 volt supply line 6 respectively through resistors R–8 and R–9, the tubes, and resistor R–10 to the negative 250 volt supply line 5. The grid of triode V–2b is coupled to the plate of triode V–2a by means of condenser C–4 and is also connected by means of resistor R–11 to the resistor divider circuit which extends between the positive 150 volt supply line 6 and ground and which includes resistors R–12 and R–13. As shown in the drawing, resistor R–13 is preferably adjustable to control the sensitivity of multivibrator circuit of triodes 2a and 2b.

The plate of triode V–2b is coupled to the grid of triode V–4 through the series connected condenser C–5 and resistor R–14 whereas condenser C–6 ties the grid of V–4 to ground. The plate circuit of triode V–4 extends from the positive 300 volt supply line 8 through resistor R–15 relay pick-up winding K–1, and the tube to ground. The junction of resistor R–14 and condenser C–5 is coupled to ground as shown through resistor R–16 and through diode V–5. As will be more apparent hereinafter the parallel arrangement of resistors R–14 and R–16 and condenser C–6 between the grid of triode V–4 and ground provides an effective filter for the high frequency A.C. components of the square wave product at the plate of diode V–5.

The armature K–2b is coupled to the junction of condenser C–5 with the plate of triode V–2b through the series connected resistor R–17 and condenser C–7. One selective contact of armature K–2b is connected to the junction of resistor R–14 with condenser C–5 whereas the other contact thereof is connected to the positive 300 volt supply line 8 through resistor R–18.

In operation during the gate interval of gate circuit 3 the video echo pulses as well as other extraneous noises and signals are delivered in the form of positive surges to the control grid of the normally cut-off cathode follower V–1. The cathode follower passes these positive pulses through condenser C–1 and diode V–3 to condenser C–2 where a positive charge is collected. Thus, the charge across condenser C–2 is lifted periodically step by step in response to successive gates of the gate circuit 3 and then decreases exponentially through resistor R-6 to ground between successive steps thereof. The magnitude of the charge that is contributed to C-2 in any one pulse is limited by that which is delivered to and collected upon condenser C-1. In this way as will be more apparent hereinafter no single occasional relatively large pulse is able to charge condenser C-2 to a critical valve where the multivibrator circuit of triodes V-2a and V-2b will be triggered.

As will also be more apparent hereinafter the exponential discharge of condenser C-2 through resistor R-6 requires that the gated pulses from the cathode follower occur and recur at a certain minimum frequency in order to trigger the multivibrator circuit.

Due to the positive potential maintained at the grid of triode V-2b of the multivibrator circuit by means of the resistor divider circuit that includes R-12 and R-13, triode V-2b normally conducts so long as no recurring video target echo signal is received. Accordingly, the flow of plate current through triode V-2b and through its relatively large cathode resistor R-10 produces a positive potential at the cathode thereof such that triode V-2a is normally biased to cut-off. When, however, the charge across condenser C-2 reaches a predetermined critical value, which depends upon the various circuit constants, triode V-2a begins to conduct and its plate potential drops abruptly. This negative surge at the plate of triode V-2a is then fed through condenser C-4 to the grid of triode V-2b to cut it off and initiate oscillations similar to those of a conventional multivibrator circuit. These oscillations continue so long as the potential of condenser C-2 and the grid of triode V-2a are maintained at or above the aforesaid critical value.

Each negative surge at the plate of triode V-2b during energization of the multivibrator is fed through condenser C-5 and resistor R-14 to the grid of triode V-4. When this occurs triode V-4 which normally conducts and energizes relay K-1 and the search circuits of the radar apparatus not shown in the drawing, triode V-4 is immediately cut off, the relay K-1 de-energized and the tracking circuits of the radar apparatus activated. Accordingly, so long as the echo signals from the selected target are being received, the multivibrator continues to oscillate, triode V-4 continues to remain cut off and the tracking circuits of the apparatus continue to follow the target.

If during the tracking operation, a predetermined small number of echo signals fail to be detected, the negative charge developed across condenser C-5 maintains triode V-4 in its cut off condition until the exponential discharge of C-5 through resistor R-16 permits it to fire and thereby reinitiate the search circuits of the apparatus. In this way the so-called memory circuit of the apparatus is provided.

Relay K-2 with its component contacts K-2a and K-2b provide a convenient manual means for causing the apparatus to stop tracking one target and start the searching operation for another. Accordingly, when relay K-2 is energized and its contacts K-2a and K-2b are operated to their uppermost positions the charges across condensers C-2 and C-5 are rapidly changed by the energy respectively provided by condensers C-3 and C-7 such that the oscillations of the multivibrator are halted and the memory charge across condenser C-5 is wiped out. As a result, triode V-4 begins to conduct, relay K-1 is energized and the searching operation is activated until a new target is contacted.

Obviously many modifications and variations of the present invention are possible in the light of the above teachings. It is therefore to be understood that within the scope of the appended claims the invention may be practiced otherwise than as specifically described.

What is claimed is:

1. An alarm circuit for a gated video radar receiver comprising a multivibrator circuit; means dependent upon energization of the multivibrator circuit for controlling the searching and tracking operations of the radar receiver; a condenser arranged to control energization of the multivibrator circuit; and a current limiting charging circuit for the condenser, which circuit permits the accumulation of a charge on the condenser sufficient to effect the energization of the multivibrator circuit only after a predetermined number of video target pulses have been detected by the radar receiver within a predetermined interval and selective means for rapidly discharging the accumulated charge on the condenser.

2. An alarm circuit for a gated video radar receiver comprising an alarm relay; a normally conducting triode which controls energization of the relay; a normally non-oscillating multivibrator circuit including a normally energized section and a normally de-energized section; a first condenser; means including the first condenser for coupling the output of the normally energized section to the control grid of the triode; a second condenser arranged to control energization of the normally de-energized section of the multivibrator circuit; and a current limiting charging circuit for the second condenser, which circuit fires the normally de-energized section of the multivibrator circuit in response to the occurrence of a predetermined number of consecutive video target echo pulses and selective means for rapidly discharging the said first and second condensers.

References Cited in the file of this patent

UNITED STATES PATENTS

| | | |
|---|---|---|
| 2,514,677 | Skellett | July 11, 1950 |
| 2,536,488 | Boothroyd et al. | Jan. 2, 1951 |